Sept. 19, 1950   R. C. MERCER   2,522,631
AUTOMATIC FOCUS ADJUSTING MEANS FOR CAMERAS
Filed June 6, 1947   2 Sheets-Sheet 1
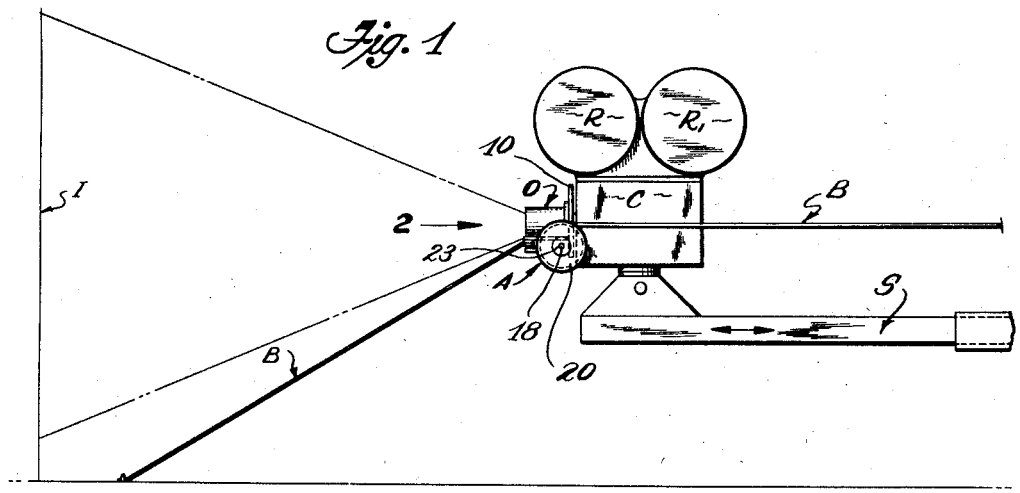
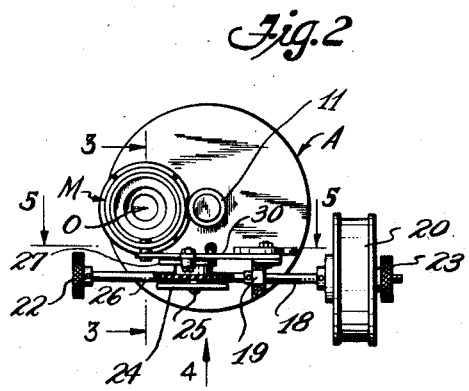
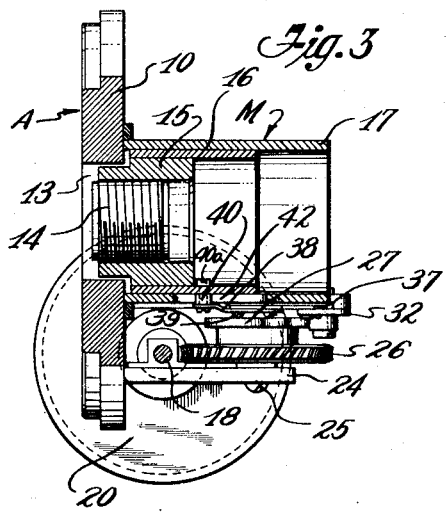
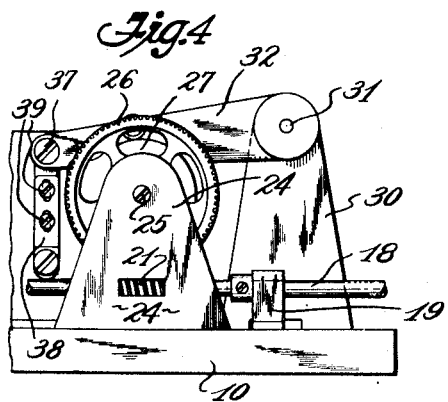
INVENTOR.
RAYMOND C. MERCER
BY Luther L. Mack,
Attorney

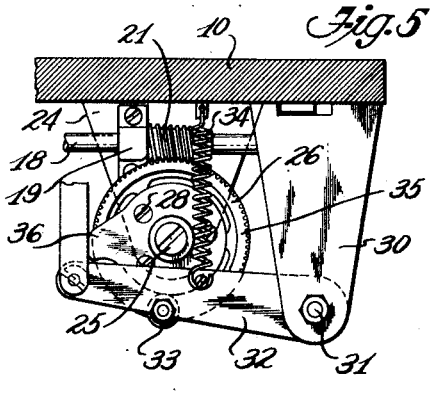
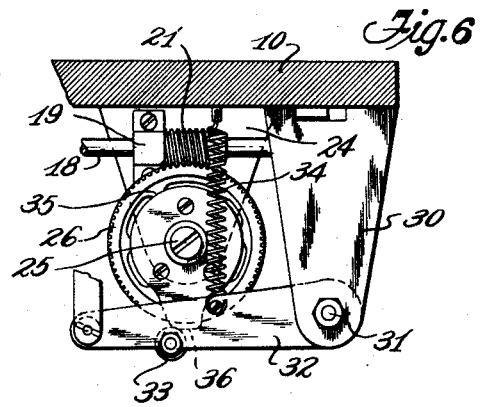
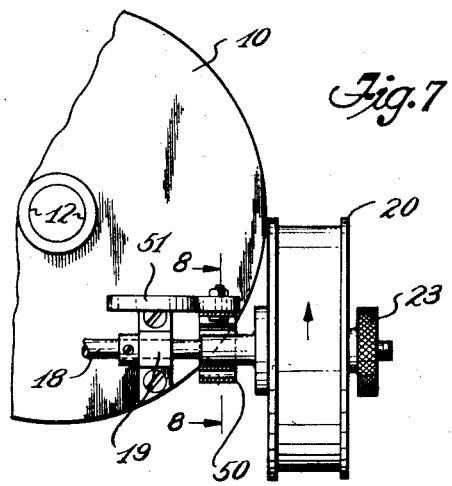
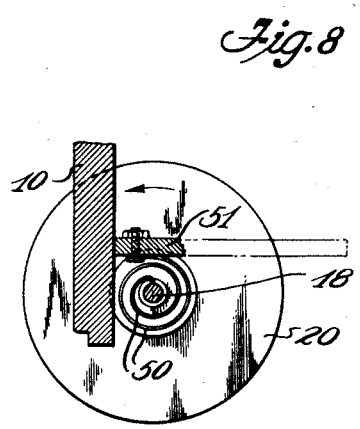

Patented Sept. 19, 1950

2,522,631

UNITED STATES PATENT OFFICE 2,522,631

AUTOMATIC FOCUS ADJUSTING MEANS FOR CAMERAS

Raymond C. Mercer, Los Angeles, Calif.

Application June 6, 1947, Serial No. 752,888

2 Claims. (Cl. 95—45)

This invention relates in general to optical apparatus but particularly to and has for an object the provision of an apparatus which can be readily adjusted to and from opposite extremes of movement relative to a subject or scene in the plane of the optical axis of a camera for selectively photographing a subject, or portions thereof, from focal points near to or remote from the subject plane.

A more detailed object is to so dispose a camera on a suitable support that the objective may be quickly adjusted on its focal axis relative to an image bearing screen, or other surface, to different positions for expeditiously and faithfully providing reproductions of all or parts of an image without occasioning the necessity for resetting the camera as different exposures are made on a film of a camera.

An important object is to provide means for adjusting the camera lens relative to the subject plane as the camera is moved toward or away from the subject plane so as to produce zoom effects or reverse effects.

Another object is to provide an attachment for a camera which may be readily secured in position to most commercial camera housings for producing the aforesaid effects in an economical and satisfactory manner.

Other objects will appear hereinafter.

I have shown in the accompanying drawings a suitable structure for attaining the objects of my invention, in which:

Fig. 1 is a side elevational view of a camera mounted relative to the plane of a subject and bearing my improvements;

Fig. 2 is an enlarged front view as seen in the direction of arrow 2 in Fig. 1;

Fig. 3 is a sectional elevation on line 3—3 of Fig 2;

Fig. 4 is a bottom plan as seen in the direction of arrow 4 in Fig. 2;

Figs. 5 and 6 are sections on line 5—5 of Fig. 2 showing different positions of a motivating unit;

Fig. 7 shows a partial view of a modified form of apparatus; and

Fig. 8 is a section on line 8—8 of Fig. 7.

Referring first to Fig. 1, I have shown a camera C longitudinally adjustable on a support S relative to a subject plane I and having usual reel magazines R and R₁, an objective lens and mounting generally represented at O, and my attachment A secured to the front of camera C, for maintaining the camera in focus regardless of the nearness or remoteness of the camera from the subject plane as the camera is moved relative to the subject plane I.

Attachment A includes a supporting disc 10 fixed to the front wall of the camera housing as by means of a central bolt or screw 11 in a threaded hole 12 (Fig. 7). As shown in Fig. 3, the disc 10 is bored at 13 to receive members 14 and 15 of a lens mounting which also includes lens carrier tube 16 sliding in lens mounting tube 17 which latter tube is fixed to the front of the plate. Disc 10 also operatively supports a transverse shaft 18 carried in one or more bearings 19 and on which is fixed a pulley 20, a worm 21, and knobs 22 and 23 at the ends of the shaft. Disc 10 has an arm 24 fixed to or integral therewith which carries a stud 25 on which a worm gear 26 is supported for meshing with worm 21 and which is adapted to be driven thereby.

A cam 27 is fixed to gear 26 as by means of screws 28 or otherwise so as to afford means of rotating the cam through said gear as pulley 20 is rotated when and as camera C is adjusted on its support to different positions.

A second arm 30 is fixed to or formed on disc 10 for pivotally supporting at point 31 a follower lever 32 bearing a follower roller 33 adapted to engage the periphery of cam 27. Lever 32 and follower 33 are tensioned against cam 27 by means of a spring 34 attached at opposite extremities to the lever and disc 10. Cam 27 has a concentric dwell 35 and a projecting cam face 36 for the purpose of varying the focus of the objective as the camera is moved toward or away from the subject plane. The form of the cam, therefore, depends upon the focal lengths of different lenses as well as the desired range of movement of the camera relative to the subject plane.

Lever 32 is so connected with lens carrier 16 that as said lever is moved outwardly by cam face 36 against the tension of spring 34 that the lens will be adjusted in one direction and when not under the extending influence will be retracted within a given range defined by the mechanism. By reference to Figs. 3 and 4, it may be noted that the outer end of lever 32 is pivotally attached at 37 to a link 38 adjustable as by means of screws 39 while an end of bar 38 is connected by stud 40a to slidable lens tube 16. Stud 40a serves to mount a roller 40 which works in an axially extending slot 42 in lens housing member 17. Thus the range of camera adjustment is determined by the throw of cam 27 and travel permitted roller 40 by the length of slot 42.

Now, pulley 20 is arranged to receive and hold one or more turns of cord, cable, or the like B.

Cable B is anchored at both of its ends in taut condition, so that as the camera is moved along its focal axis after being first focused at any point within its travel, the adjustment of the camera will merely wind or unwind cable B and at the same time and to a corresponding extent move the objective O and thereby maintain the camera in focus relative to the subject.

In Figs. 7 and 8 I have shown a slight modification of the structure previously described. Particularly, such a modification includes the provision of a coiled spring 50 having one end fixed to shaft 18 and its other end attached to an arm or plate 51 extended from disc 10. Thus, as pulley 20 is turned by the cord B in one direction, the spring 50 will be tensioned on shaft 18 and when the pulley is released the spring will unwind and retract the lens by means of the stored energy of the spring. In both forms herein shown, however, the movement of the camera will produce similar results. The camera may be moved by any suitable means, as for instance by rotation of the pulley by hand in the form of the invention in which both ends of the cord are fixed to points in front of and behind the camera.

Thus, as the camera is adjusted longitudinally of the optical axis, the objective is correspondingly and automatically adjusted relative to the subject plane thereby eliminating separate adjustments of the camera and its lens.

I claim:

1. In an automatically focussed camera guided for movement to and from a plane in which the subject is positioned, automatically operated focussing means comprising: a plate mounted on the front of the camera, relatively adjustable lens element mounting means carried by said plate; a rotatable shaft mounted in bearings carried by said plate to extend across said plate; a worm rotated by said shaft; a worm gear meshing with said worm and mounted on said plate; a cam rotated by said worm gear; cam follower means mounted on said plate; means transmitting the movement of said follower means to the relatively adjustable lens mounting means; a pulley mounted on said shaft; and an extended flexible member wound around said pulley with its ends secured against movement at points spaced from and in front of and behind the camera in the line of its movement, the arrangement being effective to maintain the focus of the camera lens throughout the range of movement of the camera.

2. Photographic apparatus as set forth in claim 1 and in which all the lens focussing elements are mounted on a plate detachably mounted on the camera front.

RAYMOND C. MERCER.

REFERENCES CITED

The following references are of record in the file of this patent:

UNITED STATES PATENTS

| Number | Name | Date |
| --- | --- | --- |
| 1,244,254 | Steadman | Oct. 23, 1917 |
| 1,252,762 | Young | Jan. 8, 1918 |
| 1,551,698 | Robertson | Sept. 1, 1925 |
| 1,726,350 | Hersberg | Aug. 27, 1929 |
| 2,027,411 | Whittaker | Jan. 14, 1936 |
| 2,208,403 | Winchester | July 16, 1940 |
| 2,389,087 | Schubert | Nov. 13, 1945 |

FOREIGN PATENTS

| Number | Country | Date |
| --- | --- | --- |
| 669,358 | Germany | Dec. 24, 1938 |